April 28, 1942.  D. A. DARBY  2,281,417
SAFETY VALVE
Filed May 24, 1939  2 Sheets-Sheet 1
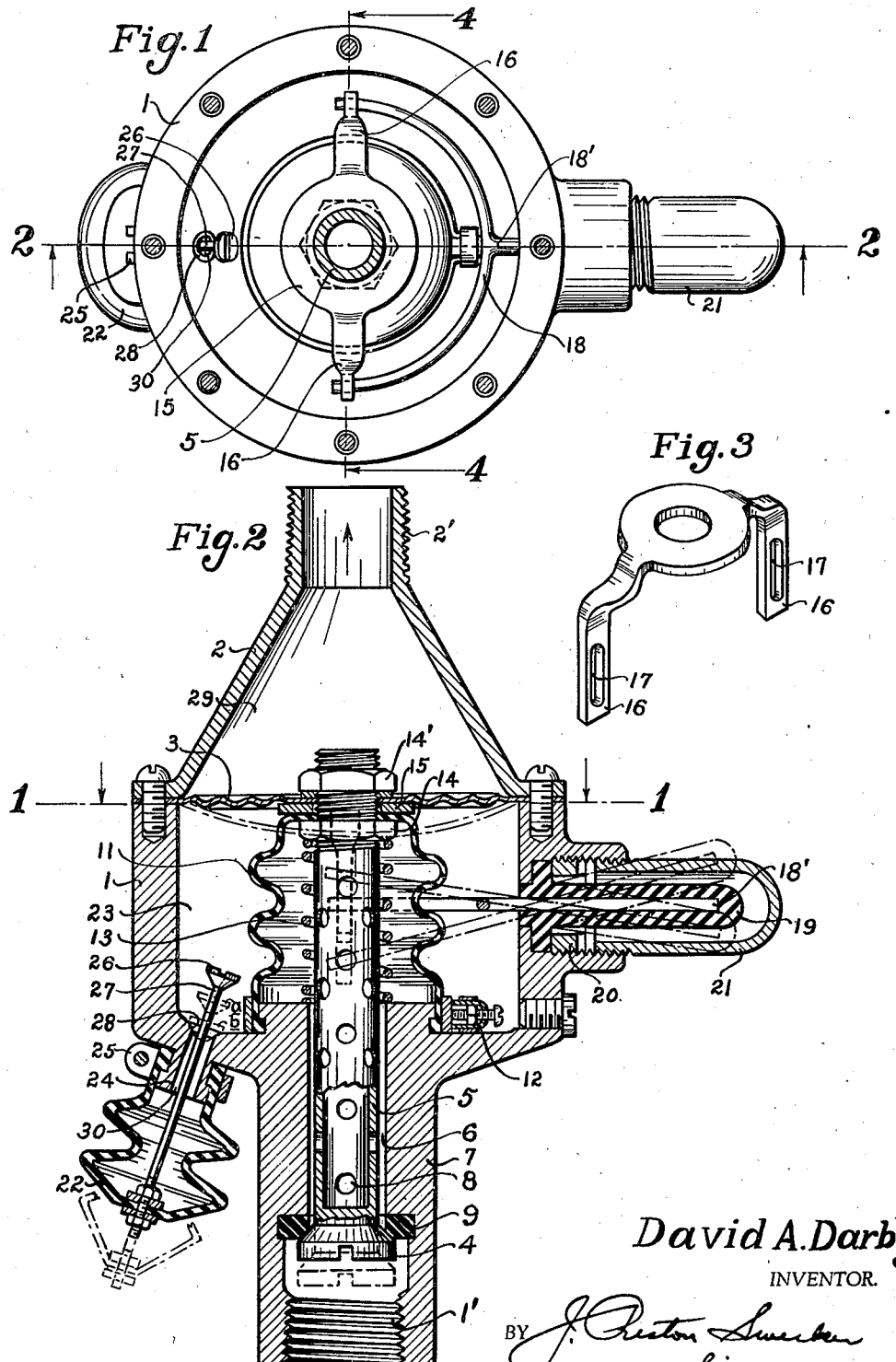
David A. Darby
INVENTOR.
BY
ATTORNEY.

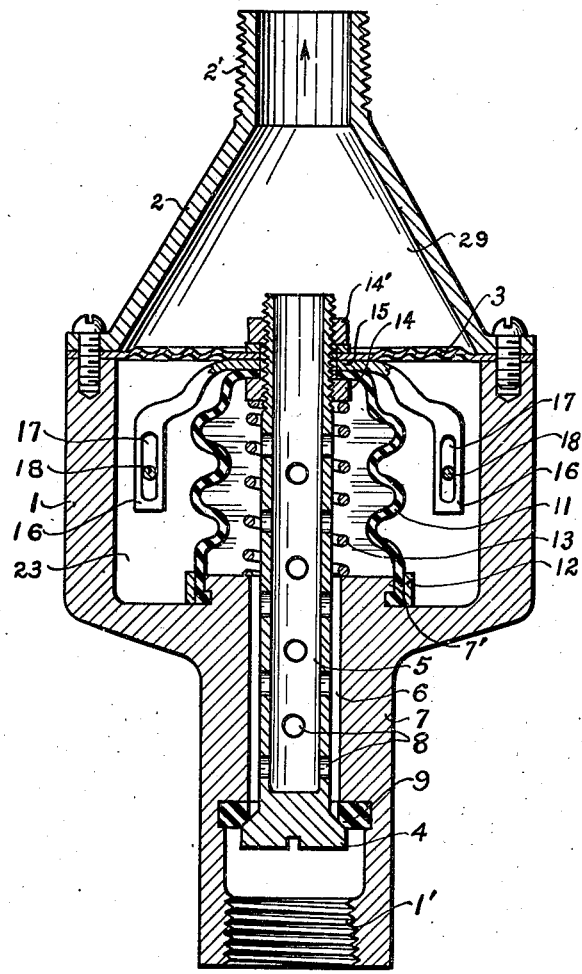

Patented Apr. 28, 1942

2,281,417

UNITED STATES PATENT OFFICE 2,281,417

SAFETY VALVE

David A. Darby, Wichita Falls, Tex., assignor of one-half to George F. Smith, Wichita Falls, Tex.

Application May 24, 1939, Serial No. 275,547

7 Claims. (Cl. 137—153)

This invention relates to an improvement in the combination of automatic low pressure gas cut-off valve and a valve capable of manual operation, and which does not have glands that present places for leaks.

This safety valve has been designed with safety and efficiency as the paramount objects, and it will operate in any position and under any normal working conditions over an indefinite period of time with assured safety.

The valve is so controlled that in event of a failure of a diaphragm or bellows, it will automatically cut off the gas until such parts as are out of condition are repaired. The device operates on a differential between the atmospheric and gas pressures with a spring to close the valve.

The valve may be used either externally of a building or internally thereof, and if used externally of the building a single valve will protect the entire building against substantial reduction of the gas pressure, allowing the fires to go out, and then the gas coming on again and collecting and causing great danger to life and property. If the valve is used inside the building, an individual unit may be used near each gas appliance and the gas may be turned on manually each time it is desired to use the appliance, and manually turned off each time the use of the gas is discontinued, and in event the pressure, for any reason, should drop below a predetermined point, the valve will automatically close until manually reset.

Various safety devices have been proposed for use in connection with gas appliances but many of them present hazards greater than those that they are intended to correct.

While the accompanying drawings illustrate a preferred embodiment of the invention, it is to be understood that the design may be varied and changes made in the minor details of construction within the scope of the invention as claimed without departing from the spirit thereof.

In the accompanying drawings:

Fig. 1 is a horizontal section on the line 1—1 of Fig. 2, showing the interior of the bellows chamber;

Fig. 2 is a vertical longitudinal section taken on the line 2—2 of Fig. 1;

Fig. 3 is a perspective view of a yoke member used for manual operation of the valve; and Fig. 4 is a vertical section on the line 4—4 of Fig. 1.

With more detailed reference to the drawings, the numeral 1 designates the body of the device having a cover 2 thereon. The body 1 has a threaded connection 1' for attachment to an inlet gas line, while the cover 2 has a threaded connection 2' for attachment to a pipe leading to an outlet pipe, to permit the outlet of gas.

A diaphragm 3 is interposed between the members 1 and 2 and the diaphragm 3 is responsive to atmospheric pressure on the lower (body) side of the diaphragm. On the opposite or upper side, the diaphragm is subject to the pressure within a gas conduit system controlled by a valve 4 connected with the diaphragm 3. The valve 4 has a hollow stem 5 which fits loosely in the bore 6 of a neck 7 on the body member 1. In the sides of the valve stem 5 are perforations 8 which permit the gas to enter the hollow stem 5 when the valve 4 is open. The valve 4 preferably engages a resilient seat 9; however, a metallic seat may be used in some instances, if desired.

The upper end of the valve stem 5 is secured to the diaphragm 3. Also secured to the upper end of the valve stem 5 is a resilient bellows member 11 which forms a vapor tight compartment around the valve stem, as its lower end is secured around a shoulder 7' by a clamp 12 which prevents the gas from escaping from around the valve stem into the surrounding chamber. Within this bellows is a coiled spring 13 interposed between the shoulder 7' and a nut 14 on the upper end of the valve stem 5 of a predetermined strength so as to regulate the minimum pressure which holds the valve 4 open.

A flat ring 15 is interposed between the nut 14 and the diaphragm 3, being clamped by a nut 14' screwed on the upper end of the valve stem 5. The ring 15 has depending arms 16, provided with elongated slots 17 therein receiving the arms of a yoke 18, the handle 18' of which is embedded in a flexible member 19. By manipulation of the flexible handle member 19, the valve 4 may be manually operated. The member 19 is preferably made of rubber, and is secured in place by a nut 20. A cover 21 is provided for protection of protruding handle member 19.

The diaphragm 3 may be made of any yieldable material such as thin metal with annular corrugations therein, or it may be made of sheet rubber with sufficient resiliency, to permit the desired movement of the valve 4 to the dotted line position indicated in Fig. 2.

A secondary bellows member 22 is provided which communicates with chamber 23 in the body 1 and is responsive to variations in the pressure in the chamber 23 due to the movement of diaphragm 3.

The interior of the bellows 22 normally is in open communication with chamber 23 and maintains a pressure within the bellows 22 and the chamber 23 substantially at atmospheric pressure. However, the bellows 22 has a vapor tight joint with a neck 24 on the body 1 and clamp 25 secures this bellows in place. A valve 26 is carried by a valve stem 27 extending through the bellows 22 and said valve 26 positioned within the interior of chamber 23 in position to seat against valve seat in the body 1.

Under normal operation the movement of the diaphragm 3 will cause valve 26 to move into position as indicated in dotted lines at *a*, however, if the diaphragm 3 or the bellows 11 should become ruptured, and the chamber 23 becomes filled with gas to a predetermined pressure higher than atmospheric pressure, valve 26 will move into position as indicated at *b* and seats upon valve seat 28, thus closing all possible avenue of outlet of gas, even if bellows 22 should thereafter become ruptured. However, normally the bellows 22 should hold any leakage that might take place. As soon as the pressure in chamber 23 and the chamber 29 in the cover 2, becomes equal, valve 4 will close under the pressure of the spring 13 and will remain closed and inoperative until such repairs as are necessary, have been made. If a pipe should burst at a point beyond the discharge from the valve the sudden rush of gas from the chamber 29 will lower the pressure acting upon diaphragm 3 and permit the valve 4 to close under the tension of the spring 13.

It is particularly to be noted that both valves 4 and 26 seat more securely as additional pressure is put on the valves, as both of them seat in the direction in which the gas travels and will not be opened by excessive gas pressure causing the yielding of the valve members.

It is pointed out further that the valve stem 27 is positioned loosely in opening 30 to permit the air to move back and forth freely between chamber 23 and the bellows 22. However, the device will operate as effectively without valve 26 and bellows 22, but due to the possibility of leaks in diaphragm 3 and bellows 11, it is highly desirable to have this auxiliary safety device installed substantially as shown.

The device is intended to be used in a gas line leading to a burner or other point of consumption.

When the valve 4 is open, the gas passes into partially hollow valve stem 5 through the perforations 8 and out at the upper end of hollow valve stem 5 into chamber 29.

The pressure in chamber 23 is substantially atmospheric, as the secondary bellows 22 is made of yieldable material that is responsive to minute changes in pressure; that is, if the diaphragm should lower into chamber 23 as indicated by dotted outlines, the secondary bellows will move outward so as to increase the pressure in chamber 23. As the diaphragm recedes to position as indicated by full lines, the secondary bellows 22 will also recede.

This valve will operate effectively on any pressure fluids, including liquids, and it is not restricted to gas.

I claim:

1. In a pressure valve of the character described, a body having two compartments therein, a diaphragm disposed within said body between said compartments and responsive to pressure in said compartments, a valve attached to said diaphragm and normally held open by said diaphragm when under pressure, manual means for opening said valve, resilient means tending to close said valve, a valve stem for said valve, and a bellows within one of said compartments and forming a vapor tight compartment and attached to the valve stem at an end thereof.

2. In a pressure valve of the character described, a body having two compartments therein, a diaphragm disposed within said body between said compartments and responsive to pressure in said compartments, a valve attached to said diaphragm and normally held open by said diaphragm when under pressure, manual means for opening said valve, resilient means tending to close said valve, a valve stem for said valve, a bellows within one of said compartments and forming a vapor tight compartment and attached to the valve stem at an end thereof, and a secondary bellows attached to the body and connected with one of said compartments and responsive to atmospheric pressure.

3. In a pressure valve of the character described, a body having two compartments therein, a diaphragm disposed within said body between said compartments and responsive to pressure in said compartments, a valve attached to said diaphragm and normally held open by said diaphragm when under pressure, manual means for opening said valve, resilient means tending to close said valve, a valve stem for said valve, a bellows within one of said compartments and forming a vapor tight compartment and attached to the valve stem at an end thereof, a secondary bellows attached to the body and connected with one of said compartments and responsive to atmospheric pressure, and a valve connected with and operable by said secondary bellows.

4. In a pressure valve of the character described, a body having two compartments therein, a diaphragm disposed within said body between said compartments and responsive to pressure in said compartments, a valve attached to said diaphragm and normally held open by said diaphragm when under pressure, manual means for opening said valve, resilient means tending to close said valve, a valve stem for said valve, a bellows within one of said compartments and forming a vapor tight compartment and attached to the valve stem at an end thereof, a secondary bellows attached to the body and connected with one of said compartments and responsive to atmospheric pressure, and a valve connected with and operable by said secondary bellows, said valve seating in an outwardly direction.

5. A safety valve comprising a casing structure having spaced chambers therein with a pressure responsive member therebetween, a hollow valve stem connected with said member and extending therethrough for directing gaseous pressure into one of said chambers, valve means coacting with said valve stem for controlling the passageway therethrough, a ring surrounding said valve stem and secured thereon, said ring having depending arms, and a yoke having lost-motion connection with said arms for bodily moving the valve stem.

6. A safety valve comprising a casing structure having spaced chambers therein with a pressure responsive member therebetween, a hollow valve stem connected with said member and extending therethrough for directing gaseous pressure into one of said chambers, valve means coacting with said valve stem for controlling the passageway therethrough, a ring surrounding said valve stem and secured thereon, said ring having depending arms, a yoke having lost-motion connection with said arms for bodily moving the valve stem, and resilient means mounting said yoke in a side of the casing structure for swinging movement relative thereto.

7. A pressure valve comprising a body portion having a diaphragm therein with chambers on opposite sides of said diaphragm, said body portion having an opening therein, a valve controlling said opening, a valve stem connecting said valve with the diaphragm, said valve stem having a passageway therethrough from within said opening adjacent the valve to the opposite side of the diaphragm, manual means for opening said valve, and resilient means tending to close said valve.

DAVID A. DARBY.